United States Patent
Faloutsos et al.

[19]

[11] Patent Number: 5,946,692
[45] Date of Patent: Aug. 31, 1999

[54] COMPRESSED REPRESENTATION OF A DATA BASE THAT PERMITS AD HOC QUERYING

[75] Inventors: Christos N. Faloutsos, Silver Spring, Md.; Hosagrahar Visvesvaraya Jagadish, Berkeley Heights, N.J.; Philip Russell Korn, College Park, Md.

[73] Assignee: AT & T Corp, Middletown, N.J.

[21] Appl. No.: 08/848,454

[22] Filed: May 8, 1997

[51] Int. Cl.⁶ .................................................. G06F 17/30
[52] U.S. Cl. ........................ 707/101; 707/100; 707/104; 707/2; 707/1
[58] Field of Search .................................. 707/101, 100, 707/104, 2, 1

[56] References Cited

U.S. PATENT DOCUMENTS

| | | | |
|---|---|---|---|
| 5,257,365 | 10/1993 | Powers et al. | 707/100 |
| 5,448,733 | 9/1995 | Satoh et al. | 707/2 |
| 5,481,704 | 1/1996 | Pellicano | 707/5 |
| 5,603,022 | 2/1997 | Ng et al. | 707/101 |
| 5,737,733 | 4/1998 | Eller | 707/3 |
| 5,765,158 | 6/1998 | Burrows | 707/101 |
| 5,787,896 | 7/1998 | Dalal | 707/2 |
| 5,812,999 | 9/1998 | Tatento | 707/3 |

FOREIGN PATENT DOCUMENTS

| | | |
|---|---|---|
| WO 95/30981 | 11/1995 | WIPO. |
| WO 95/32477 | 11/1995 | WIPO. |

*Primary Examiner*—Paul V. Kulik
*Assistant Examiner*—Greta L. Robinson

[57] ABSTRACT

A method and system for compressing a data base that permits queries on the compressed representation of the data base. Another feature is that an approximation of the values of the data base are derivable directly from the compressed representation of the data base. Yet another feature is correction of poor approximations of the reconstructed data. Still another feature is the capability of performing aggregate queries of the compressed representation of the data base.

46 Claims, 5 Drawing Sheets

FIG. 1

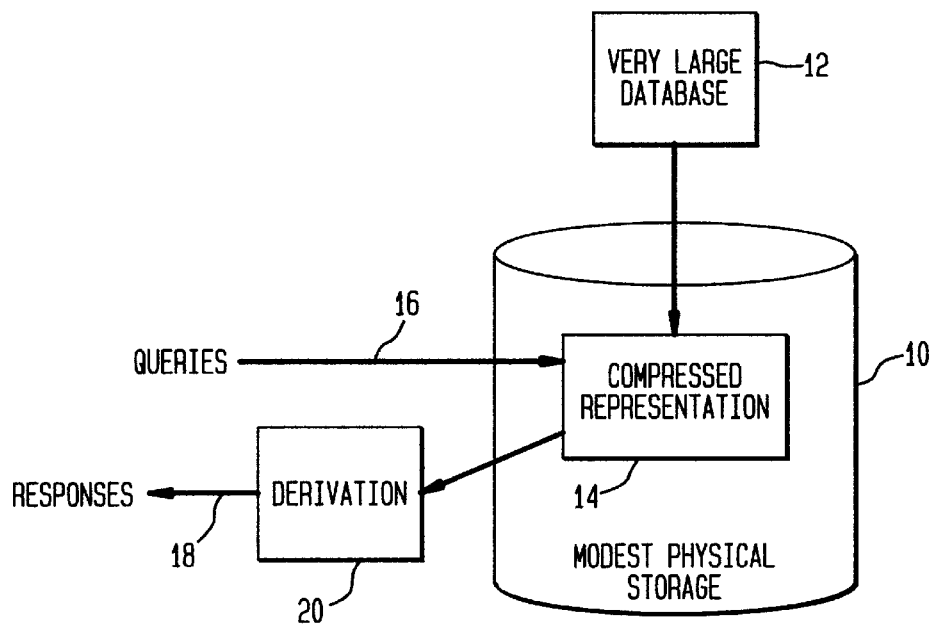

FIG. 2

| SYMBOL | DEFINITION |
|---|---|
| N | NUMBER OF RECORDS/TIME SEQUENCES |
| M | DURATION (LENGTH) OF EACH SEQUENCE |
| k | CUTOFF |
| $X$ | THE NxM DATA MATRIX |
| $\hat{X}$ | THE NxM RECONSTRUCTION OF THE DATA MATRIX |
| r | RANK OF THE DATA MATRIX |
| $\Lambda$ | DIAGONAL MATRIX WITH EIGENVALUES |
| $\lVert \cdot \rVert_2$ | EUCLIDEAN (=$L_2$) NORM |
| $\circ$ | INNER (=DOT) PRODUCT OF TWO VECTORS |
| $\times$ | MATRIX MULTIPLICATION |
| $X^t$ | THE TRANSPOSE OF X |
| $x_{i,j}$ | VALUE AT ROW i AND COLUMN j OF THE MATRIX X |
| $x_{i,*}$ | THE i-th ROW OF THE MATRIX X |
| $x_{n,j} \equiv X_j$ | THE j-th COLUMN OF THE MATRIX X |
| C | NUMBER (=COUNT) OF OUTLIER CELLS THAT WE MAINTAIN |
| $\delta_{i,j}$ | DIFFERENCE BETWEEN ESTIMATED AND ACTUAL VALUE OF CELL (i,j) |
| RMSPE | NORMALIZED MEAN SQUARED ERROR |
| O% | DISK SPACE AFTER COMPRESSION, PERCENT |

FIG. 3

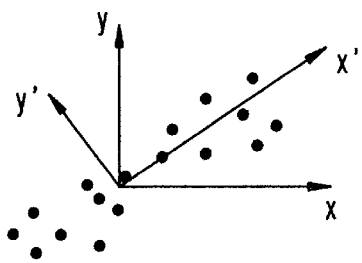

FIG. 4

```
/*INPUT: POINTER TO MATRIX X ON DISK*/
/*OUTPUT: COLUMN-TO-COLUMN SIMILARITY MATRIX C*/

FOR i:=1 TO M do
    FOR j:=1 TO M do
        C[i][j]-0;
FOR i:=1 TO N do
    READ i-th ROW OF X FROM THE DISK (X[i][1],...,X[i][N])
    FOR j:=1 TO M do
        FOR l:=1 TO M do
            C[j][l]+=X[i][j]=X[i][l]:
```

FIG. 5

```
/*INPUT: POINTER TO X ON DISK, EIGENVECTORS (V MATRIX), AND EIGENVALUES $\lambda_1$*/
/*OUTPUT: ROW-TO-PATTERN SIMILARITY MATRIX U */

FOR i:=1 TO N do
    READ X[i][=] FROM DISK;    /*ROW VECTOR OF X*/
    FOR j:=1 TO k do
        U[i][j]-0;
        FOR l:t=1 TO M do
            U[i][j]+= X[i][l]=V[l][j]:
                U[i][j]-U[i][j]/$\lambda_1$:
```

FIG. 8

```
/*input: pointer to X on disk, k_max
/*output: k_opt*/ for h:=1 so h_max do
        determine the number of cutliers C_x we can afford to store;
        compute the SVD of the array with given k (two passes);
        find the errors for every cell;
        pick the C_x largest ones (see more peas) and
        compute the error measure ch
    k_opt- value of k with the smallest error measure eh
```

FIG. 9

```
input: pointer to X on disk, k_max
output: matrices Λ, V, and U pass 1: compute the Λ and V matrices, keeping k_max eigenvalues
    estimate the number of outliers C_k that we can afford to store to stay within n*for
        k=1, 2, ..., k
    initialize k_max priority queues to store the C_k largest cell-outliers for each candidate
        value of k_max
pass 2: for each row of the data matrix,
        • compute the error of each cell according to k=1, 2, ..., k_max eigenvalues;
        • insert the appropriate cells into the appropriate priority-queue;
        • accumulate the reconstruction error eh for each k value, so far
    k_opt=the k value that gives the smallest error eh;
    using k_opt as the chosen cut-off value k, truncate the Λ and V matrices;
pass 3: pass through each row of the data matrix, to compute and print the corresponding
        row of the U matrix, using Eq. 10
```

COMPRESSED REPRESENTATION OF A DATA BASE THAT PERMITS AD HOC QUERYING

TECHNICAL FIELD

This invention relates to data base compression systems and, more particularly, to a method and system for compressing a data base having ad hoc querying capabilities on the compressed representation of the data base.

BACKGROUND OF THE INVENTION

The bulk of the data in most data warehouses has a time component, for example, sales per week, transactions per minute, phone calls per day. In such databases, decision support, such as, statistical analysis, requires the ability to perform ad-hoc queries. Several types of queries may be of interest, including:

Queries on specific cells of the data matrix such as: what was the sales volume of the Murray Hill branch on May 1, 1995?.

Aggregate queries on selected rows and columns such as: find the total sales for the N.J. branches of our company, for July 1996.

Given a data set of N time sequences (e.g., customer buying patterns, branch sales patterns, etc.), each of duration M, it helps to organize this set of N vectors of dimensionality M in an N×M matrix. The three underlying assumptions include first, the data matrix is huge, of the order of several Gigabytes. For example, in large corporations, there are millions of customers (=rows). Second, the number of rows N is much-much larger than the number of columns M, where N is on the order of millions and M is of the order of hundreds. For example, M=365 if daily data is maintained for a years duration and 10*12 if monthly data is maintained for the last decade. Third, there are no updates on the data matrix, or they are so rare that they can be batched and performed off-line.

When the data set is very large, querying for specific data values is a difficult problem. For example, if the data is on tape, such access is next to impossible. Ad hoc querying is the ability to access specific data values, either individually or in the aggregate. When the data is all on disk, the cost of disk storage, even with todays falling disk prices, is typically a major concern. Decreasing the amount of disk storage required is a valuable cost savings measure. Unfortunately, most data compression techniques require decompression of at least large portions of the data base before a query can be executed.

Algorithms for lossless compression are available (e.g., gzip, based on the well-known Lempel-Ziv algorithm, Hoffman coding, arithmetic coding, etc.). These lossless compression algorithms require decompression of part or all of the data base before a query can be performed. While lossless compression achieves fairly good compression, the difficulty with this technique has to do with reconstruction of the compressed data. Given a query that asks about some customers or some days, the entire database would have to be uncompressed, for all customers and all days, to be able to answer the query. When there is a continuous stream of queries, as one would expect in data analysis, it effectively becomes the case that the data is retained uncompressed much or all of the time.

An attempt to work around this problem is to segment the data and then compress each segment independently. If the segments are large enough, good compression may be achieved while making it sufficient to uncompress only the relevant segment. This idea works if most queries follow a particular form that matches the segmentation. For truly ad hoc querying, as is often the case in data analysis, such segmentation is not effective. A large fraction of the queries cut across many segments, so that large fractions of the database have to be reconstructed.

Thus an object of the invention is to be able to query a compressed data base without decompressing it.

Consequently, there remains a need in the art for a method for compressing a very large data base with multiple distinct time sequences or vectors, in a format that supports querying. Additionally, there remains a need for detecting and correcting reconstruction errors that occur when approximating the values of the original data base.

SUMMARY OF THE INVENTION

The foregoing objects of the invention is achieved by means of compressing a data base having cells containing values with the compressed representation having the property that at least approximations of the values of the cells of the data base are derivable directly from the compressed representation. In another aspect, the data base system has a query engine for responding to a query requesting the value of a given cell. The query engine supports individual queries and aggregate queries performed on the compressed representation of the data base. Still further, the compressed representation is randomly accessible, that is, the time required to reconstruct the value of a cell is constant with respect to the number of rows and columns. In another aspect of the invention, the query engine also supports aggregate queries of the compressed representation of the data base. In yet another aspect, a lossy compressed representation on the data base includes information for correcting the approximate values derived from the lossy compressed representation.

BRIEF DESCRIPTION OF THE DRAWINGS

In the drawings,

FIG. 1 shows an overview diagram of the method for compressing a very large data base with querying;

FIG. 2 shows a table of the list of symbols used and their definitions;

FIG. 3 shows an illustration of the rotation of axis that SVD implies;

FIG. 4 shows the pseudocode for computing the column-to-column similarity matrix C;

FIG. 5 shows the pseudocode for computing the row-to-pattern similarity matrix U;

FIG. 8 shows the pseudocode for computing SVDD using multiple passes;

FIG. 9 shows the pseudocode for an advantageous method of computing SVDD in only 3 passes;

DETAILED DESCRIPTION

Figure 6:
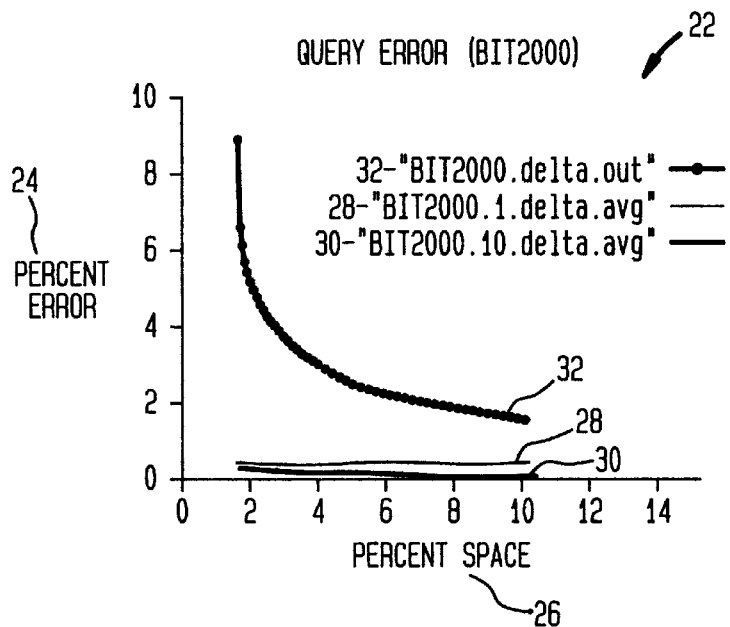
FIG. 6 shows the query error versus space overhead for aggregate queries of sizes 10% and 1% for the 2000 customers.

For a better understanding of the present invention, reference may be had to the following detailed description taken in conjunction with the appended claims and accompanying drawings.

To appreciate the various features of the invention, the following overview of the organization of the detailed description is provided. First, an overview of data base compression is presented including Singular Value Decomposition (SVD) and other compression techniques. Next, a discussion of lossy compression techniques is presented. Aggregate querying methods supported by the invention are then presented. Techniques for limiting errors made in queries of the compressed representation of the data base, such as, the delta technique are next presented. In particular, Singular Value Decomposition Delta (SVDD) is discussed. Next, an extension of the present invention to multi-dimensional data bases is presented. Finally, the detailed description ends with a brief conclusion.

I. Overview of Data Base Compression: Table 1 and FIG. 1

Table 1 provides an example of a data base having cells containing values. A matrix having rows representing customers, columns representing days of the year, and values representing the dollar amounts spent on phone calls each day is shown in Table 1. This general form of data arises in a variety of applications, including for example, warehousing applications. Alternatively, rows could correspond to patients, with hourly recordings of their temperature for the past 48 hours, or companies, with stock closing prices over the past 365 days.

TABLE 1

Example of a (customer-day matrix)

| Customer | Day We | Th | Fr | Sa | Su |
|---|---|---|---|---|---|
| ABC Inc. | 1 | 1 | 1 | 0 | 0 |
| DEF Ltd. | 2 | 2 | 2 | 0 | 0 |
| GHI Inc. | 1 | 1 | 1 | 0 | 0 |
| KLM Co. | 5 | 5 | 5 | 0 | 0 |
| Smith | 0 | 0 | 0 | 2 | 2 |
| Johnson | 0 | 0 | 0 | 3 | 3 |
| Thompson | 0 | 0 | 0 | 1 | 1 |

The mathematical machinery is applicable to many different applications, including ones where there is no notion of a customer or a day, as long as the problem involves a set of vectors or, equivalently, an N×M matrix X. For example, such a setting appears, in information retrieval systems, where rows are text documents and columns are vocabulary terms. Then the (i,j) entry shows the importance of the j-th term for the i-th document.

Applications include, at the lowest level, obtaining answers to queries, both exploratory queries as well as queries to verify hypotheses. These queries may require access to data records, either individually or in the aggregate.

Referring now to FIG. 1, a data base compression system which permits queries without reconstruction of the data base as in the present invention is shown. Generally, a modest physical storage 10 may be used because a very large data base 12 is converted into a compressed representation 14 of the data base 12. The compressed representation 14 of the data base 12 does not retain the form of the data base records but does contain information from which the content of a given record may be derived. The compressed representation 14 requires less storage space because the entire data base is not stored. Additionally, querying can be performed on the compressed representation. Thus, a reduction in physical storage space is achieved. Access to a desired data element of the data base is permitted without having to search the entire data base.

Queries 16 into the data base are performed on the compressed representation 14 without having to decompress the compressed representation. The response 18 to the query 16 involves recomputing the contents of a record from the information in the compressed representation 14. The derivation 20 of contents of the record provides for the answer to the query 16.

II. Overview of the Technique: Implementation using SVD: FIGS. 3–5

Singular Value Decomposition data base compression methods optimally compress a given database and can be utilized in the present invention. SVD is useful where least-squares optimization such as regression, dimensionality reduction, and matrix approximation are involved. SVD is based on the concepts of eigenvalues and eigenvectors. For example, for a square nxn matrix S, the unit vector u and the scalar $\lambda$ that satisfy S×u=$\lambda$×u, are called an eigenvector and its corresponding eigenvalue of the matrix S. As a reference, a table of the list of symbols and their definitions used herein are shown in FIG. 2.

Referring to Table 1 presented above, the intuition behind SVD can be explained. The set of points is represented by a N×M matrix X. This matrix could represent N customers with M days of the year, with the dollar amount spent each day. As shown in Table 1, a pattern exists. Each group corresponds to a 'pattern'. For example, $v_{1,2}=0$ means that the first day 'We' has zero similarity with the 2nd pattern, the 'weekend' pattern. It would be desirable to group similar customers together, as well as similar days together. SVD does this automatically. Referring now to FIG. 3, the rotation of the axis that SVD implies is shown. With M=2 dimensions, the customers are 2-d points as shown in FIG. 3. The corresponding 2 directions (x' and y') that SVD suggests are also shown. Thus, if allowed on k=1, the best direction to project on is the direction of x' and the next best is y'.

SVD provides for compression of a data base with a time which is constant with regard to the size of the original data base. A compression ratio of at least 40:1 can be achieved with only 5% error. SVD is effective with both two dimensional tables and time sequences. SVD may be defined as follows: given an N×M real matrix X, $$X = U \times \Lambda \times V^t,$$

where U is a column-orthonormal N×r matrix, r is the rank of the matrix X, $\Lambda$ is a diagonal r×r matrix and V is a column-orthonormal M×r matrix. Geometrically, $\Lambda$ gives the strengths of the dimensions as eigenvalues, V gives the respective directions, and U×$\Lambda$ gives the locations along the principal components where the points occur on the axis of FIG. 3. In addition to axis rotation, SVD tries to identify the "rectangular blobs" of related values in the X matrix.

Referring to Table 1, the meaning of U and V can be explained. U can be thought of as the customer-to-pattern similarity matrix and symmetrically, V is the day-to-pattern similarity matrix. The i-th row vector of U×$\Lambda$ gives the coordinates of the i-th data vector, 'customer' when it is projected in the new space dictated by SVD.

Referring now to FIG. 4, the pseudocode for an advantageous method of computing the column-to-column similarity matrix C in one pass is shown. The matrix $C=X^t \times X$ is a symmetric matrix, whose eigenvalues are the squares of the $\lambda$, elements of the $\Lambda$ matrix of the SVD of X. Moreover, the columns of the V matrix are the eigenvectors of the C matrix, where $C=V \times V^2 \times V^t$. As many eigenvectors as the space restrictions permit are kept.

Referring now to FIG. 5, the pseudocode for computing the row-to-pattern similarity matrix U is shown. Given the truncated U, Λ, and V matrices, the reconstructed value x of any desired cell (i,j) of the original matrix can be constructed.

Using the present invention, a desired cell (i,j) of a large matrix can be reconstructed in two passes, assuming that there is enough memory to hold the M×M column-to-column similarity matrix C, where $C=V \times \Lambda^2 \times V^t$. Since the C matrix is small, these computations can be done in main memory in a single pass over the data matrix. Only one more pass over the data matrix is required to determine the U matrix. Typically, the number of eigenvalues (vectors) retained is less than M, the length of each sequence, resulting in a matrix U that is much smaller than the original matrix X.

The following example using the data base from Table 1 explains SVD in greater detail. The goal is to decompose this matrix X into an equivalent form $X = U \times \Lambda \times V^t$. The matrices U, Λ, and V must be calculated. They can be obtained using SVD. The SVD decomposition is desirable because it is useful for lossy compression since this form is amenable to truncation without much of the content. The matrix Λ is composed of the eigenvalues of X on the diagonal and 0's everywhere else. The matrix V is composed of the eigenvectors in each row. Before the matrices Λ and V are created, the eigenvalues (and associated eigenvectors) are sorted according to the amplitude of the eigenvalues. Finding eigenvalues/vectors can be done using any off-the-shelf statistical package, for example, S-plus or mathematica.

Once, Λ and V have been obtained, U can be obtained by using the matrices X, Λ, and V by simple algebra, $U = X \times V \times \Lambda^{-1}$. Next the matrix X is scanned through, multiplied by the appropriate element from V, and divided by a corresponding element from $\Lambda^{31\ 1}$. The result is the following:

$$X = \begin{bmatrix} 0.18 & 0 \\ 0.36 & 0 \\ 0.18 & 0 \\ 0.90 & 0 \\ 0 & 0.53 \\ 0 & 0.80 \\ 0 & 0.27 \end{bmatrix} \times \begin{bmatrix} 9.84 & 0 \\ 0 & 5.29 \end{bmatrix} \times \begin{bmatrix} 0.58 & 0.58 & 0.58 & 0 & 0 \\ 0 & 0 & 0 & 0.71 & 0.71 \end{bmatrix}$$

The matrix X is not directly sent to a statistical package since, X may not fit into memory, and space needs to be saved. Thus, C is computed, which can fit into main memory if the number of columns is small, for example 100. Then the eigenvalues/vectors of C are found which are trivially transformed into the eigenvalues/vectors of X. In fact, the eigenvectors of X and C are the same, and the eigenvalues of X are the square-roots of the eigenvalues of C. Thus an approximation of the matrix X has been obtained.

In another example, suppose the original matrix is:

$$X = \begin{bmatrix} 2 & 1 & 5 \\ 1 & 3 & 4 \\ 7 & 2 & 8 \end{bmatrix}$$

The SVD of X is $X = U \Lambda V^t$ where $U = $ [, 1]           [, 2]           [, 3]
    [1,] −0.4170248  −0.2385079  −0.8770429
    [2,] −0.3500296  −0.8483819   0.3971491
    [3,] −0.8387906   0.4726120   0.2703115

$\Lambda = \text{diag}(12.791418, 2.821341, 1.191501)$ $V = $ [, 1]           [, 2]           [, 3]
    [1,] −0.5515896   0.7028170   0.4492183
    [2,] −0.2458441  −0.6516157   0.7176055
    [3,] −0.7970631  −0.2853861  −0.5322079

Let k=2. Therefore, out of the 3 eigenvalues needed to losslessly reconstruct the matrix, only 2 are stored, namely, the two largest eigenvalues: {12.791418, 2.821341}.

Setting $\Lambda' = \text{diag}(12.791418, 2.821341, 0) X^{\wedge} = U \Lambda' V^t =$

|       | [, 1]      | [, 2]    | [, 3]    |
|-------|------------|----------|----------|
| [1,]  | 2.4694319  | 1.749896 | 4.443844 |
| [2,]  | 0.7874281  | 2.660427 | 4.251843 |
| [3,]  | 6.8553178  | 1.768876 | 8.171412 |

All cell values are approximately equal to their original cell values in X. The entire matrix has been reconstructed. However, if just one single cell is desired, the entire matrix does not have to be reconstructed. Instead, the following equation can be used:

$$x^{\wedge}_{ij} = \Sigma \{\text{for } m=1 \text{ to } k\} (\lambda_m * V_{j,m})$$

If reconstruction of the cell (2,2) is desired, i.e., $x^{\wedge}_{2,2}$, it can be obtained using the formula above. Applying the formula above, $$x^{\wedge}_{2,2} = \lambda_1 * u_{2,1} * v_{2,1} + \lambda_2 * u_{2,2} * v_{2,2} =$$
$$12.791418 * (-0.3500296) * (-0.2458441) +$$
$$2.821341 * (-0.8483819) * (-0.6516157) = 2.660427$$

which double-checks with the middle cell of the reconstructed matrix above. Similarly, the reconstruction of any desired matrix cell (ij) can be performed in O(k) time. Thus, the compressed representation is randomly accessible. That is, the time required to reconstruct the value of a cell is constant with respect to the number of rows N and columns M.

III. Other Compression Techniques

Alternatively, clustering methods may be used for data compression. Clustering exploits the observation that the behavior of many customers is likely to be quite similar. If similar customers can be clustered together, a single cluster representative could serve as a good approximation of the others. The other customers need only have a reference to specify the correct cluster representative.

Yet another alternative for compressing the data is with spectral methods. Lossy compression of real time sequences includes Fourier analysis, wavelets and linear predictive coding. Spectral methods involve linear transformations, which effectively consider an M-long time sequence as a point in M-d space, and do a rotation of the axis. Spectral methods are tuned for time sequences, ideally with a few low-frequency harmonics.

IV. Lossy Compression Techniques and Aggregate Queries: FIG. 6

SVD, clustering and spectral methods are all lossy compression techniques. A lossy compression technique is one that does not contain all of the information of the original data base. These techniques permit querying the compressed representation of the data base without expanding the compressed representation. Lossy data base compression transforms the body of the data into a smaller one from which an acceptable approximation of the original data can be constructed. Alternatively, lossless data base compression transforms a body of data into a smaller body of data from which it is possible to exactly and uniquely recover the original data. While lossless data base compression provides for an exact representation of the data base it requires more memory. Thus, lossy compression methods having low approximation errors are more cost effective.

In some cases, the fact that the individual values are an approximation may not make a difference. A simple instance of this is when the approximations are good enough for the purpose at hand. A more interesting instance is queries involving aggregates. Aggregate queries are queries that return a result that is dependent on the values of a set of cells. Typical aggregate queries return the sum of the values in a set of cells, the average of the values in a set of cells, or a count of the number of cells in the set that have values. For a given aggregate query, the normalized query error is defined as the relative error between the correct response and the approximate response, where $f()$ is the aggregate function, over a set of cells that the query specified. The query root mean squared error (RMSPE) is estimated as a function of the space overhead. Here, the errors in the individual values may offset each other so that the aggregate value computed from the approximations is much closer to the actual aggregate value than would be expected from errors in the approximations.

As an example, fifty aggregate queries can be used to determine the average of a subset of a data base 'biz100k' containing 2000 customers, 'biz2000' 22, as shown in FIG. 6. The results are graphed as percent error 24 to percent space 26. The results shown are averaged over the fifty queries when the query touched both 1% of the cells and 10% of the cells. For both 1% and 10% of the cells touched, the error remained well below 0.5% for as little as 2% space overhead. 'Biz2000.1. delta.avg'28 represents 1% of the cells touched, and 'biz2000.10. delta.avg'30, represents 10% of the cells touched. FIG. 6 also shows the error for the queries on individual cells, that is, 'biz2000. delta.out'32. As expected, the error decreases with the size of the query, because individual cell errors cancel out on aggregate queries.

V. Delta Techniques: FIGS. 7–11

Yet another feature of the present invention limits the errors made on data bases that have been compressed with lossy compression techniques. The feature should be referred herein as the "delta technique." There is always the possibility that some data may poorly approximate the data base value when reconstructed. Some applications may require limits on the errors in the application. These can be provided using delta techniques.

The delta techniques store in a separate table information needed to correct poor approximations. This approach achieves a reduction in overall error. By optimizing the number of principal components to keep and separately storing reconstruction errors, the total error for the storage space available is minimized. Storing the errors in a separate table accounts for values that may follow patterns that are expected but deviate in some cells. Thus, it is more appropriate to store the deviation (also called delta or (outliers) for the particular cells versus treating the entire set of values as an outlier. Other methods may come to mind depending on circumstances or economics, for example saving the correct values themselves.

Figure 7:
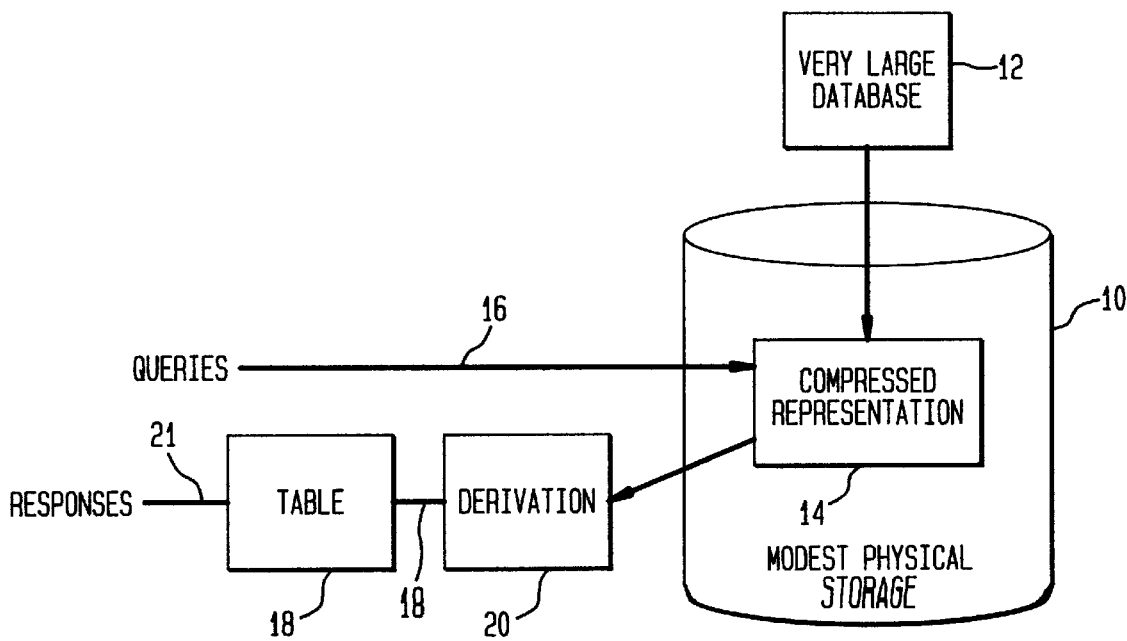
FIG. 7 shows an overview diagram of SVDD.

An advantageous method for implementing the delta technique for correcting poor approximations of values in the data base, Singular Value Decomposition Delta is shown in FIG. 7. SVDD corrects for poor approximations of the reconstructed data, such as outliers. SVDD supplements the lossy compression representation with a table 19, shown in FIG. 7, that permits correction of entries where the approximations provided by the lossy compression or SVD representation are poor. The outlier information is stored is a separate table. The cells with reconstruction errors are stored in the table at the cell level rather than the row level. Thus the cells are chosen for which the SVD reconstruction shows the highest error. So, a set of triplets of the form (row, column, delta) are maintained.

Delta is the difference between the actual value and the value that SVD reconstructs. Because a given customer may follow an expected pattern, with a few deviations on some particular days, it is more reasonable to store the deltas for those specific days, versus treating the whole customer as an outlier. Thus, this feature cleans up any gross errors that the SVD reconstruction may have been unable to handle.

FIG. 8 shows one method for computing SVDD. SVDD solves the problem of finding the optimal number of principal components $k_{opt}$ to keep to minimize the total reconstruction error. SVDD considers the storage space available and selects the largest value that does not violate the space requirements. $C_k$ is the count of outlier cells that can be stored when maintaining k eigenvalues.

Referring now to FIG. 9, a further method for computing SVDD is shown. Others may come to mind from studying the present example. Here several passes over the data have been eliminated so that the entire operation can be performed in only three passes. Priority queues for the outliers are created with one queue for each candidate value. Additionally, all the necessary outliers for all the queues are computed in a single pass over the data matrix.

The data structures for SVDD include storing the U matrix, $k_{opt}$ eigenvalues and V matrix. Additionally, the $C_{k_{opt}}$ triplets of the form (row, column, delta) for the outliers cells must be stored. It is advantageous to store the values in a hash table, where the key is the order of the cell in the row major scanning. A hash table is a data structure for storing text and/or numbers that enables quick lookup of numbers and/or text. Alternatively, a main-memory Bloom filter, may be used which predicts the majority of non-outliers, and thus save several probes into the hash table.

Reconstruction of the value of a single cell (i,j) can now be easily constructed using SVD. One probe of the hash table determines if this cell is an outlier. If so, the corresponding difference between the estimated and actual value of the single cell is added to the outlier and the reconstruction error is reduced.

Figure 10:
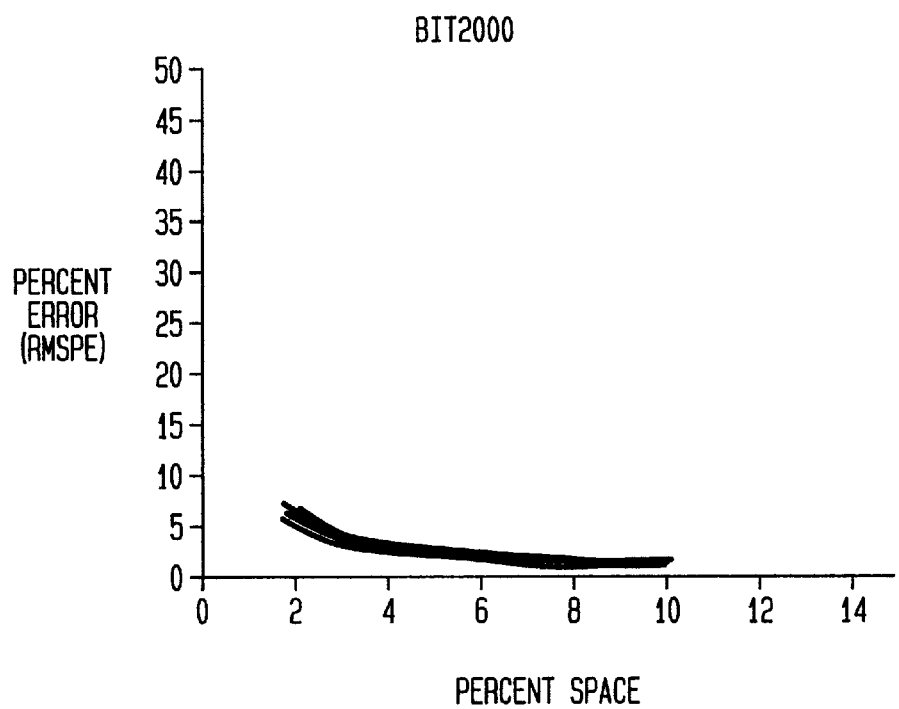
FIG. 10 shows the reconstruction error versus the disk storage space required for SVDD for 2000 customers.

SVDD has many advantages, including improved accuracy for available space. Again, RMSPE can be used to measure the reconstruction error. Referring to FIG. 10, the reconstruction error (RMSPE) as a function of the ratio of disk space required to store the compressed format versus storing the entire matrix is shown. As shown in FIG. 10, the percent error was less than 5% for SVDD.

Figure 11:
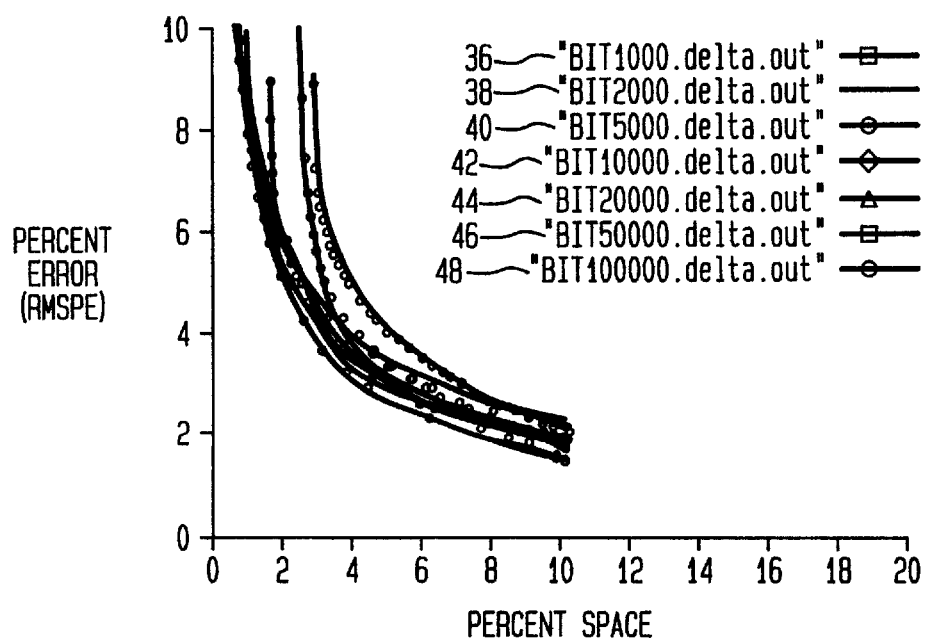
FIG. 11 shows the reconstruction error versus disk storage space required using SVDD for a data set of 100,000 customers, and subsets of the data of 1,000, 2,000, 5,000, 20,000 and 50,000 customers.

The reconstruction error using the SVDD delta technique is shown in FIG. 11. Another advantage of the SVDD delta technique is the ability to handle a large subsets of a sizeable data base. As shown in FIG. 11, curves for subsets of size N=1,000(i.e. 'biz1000.delta.out'36), 2000 (i.e. 'biz2000.delta.out'38), 5000 (i.e. 'biz5000.delta.out'40) 10,000 (i.e 'biz10000.delta.out'42), 20,000 (i.e. 'biz20000.delta.out'44), 50,000 (i.e.

'biz50000.delta.out'46) and the full set of N=100,000 (i.e. 'biz100000. delta.out'48) are shown for customers from the 'biz100K' data base. Using SVDD, the error rate is well below 5% at the 10% space overhead level for all of the sample sizes. Additionally, the error is 4.98% much earlier, namely, for 3.07% space overhead, for the full set of 100,000 rows. Finally the graphs are fairly homogeneous for a wide span of database sizes, i.e. $1,000 \leq N \leq 100,000$. SVDD outperforms any existing methods for reducing errors with data compression, particularly for large data bases.

VI. Multi-Dimensional Data

Persons of skill in the art will appreciate that considerable variation may be made from the illustrated embodiments without departure from the true spirit and scope of the invention. For example, the present invention also applies to multi-dimensional data. For instance, a 'Datacube' with three dimensions such as productid×storeid×weekid array of sales figures may be used. The 'Datacube' may be grouped as productid×(storeid×weekid) or as (productid×storeid)×weekid. The choice of grouping is a function of the number of values in each dimension. In general, the more square the matrix, the better the compression, but also the more work that has to be done to compress the data. So the group with the largest size for the smallest dimension that still leaves it computable within the available memory resources should be selected. Since the cells in the array are reconstructed individually, how dimensions are collapsed makes no difference to the availability of access. Further, the multi-dimensional 'Datacube' data may be examined using 3-mode Principal Component Analysis (PCA). The 3-mode PCA has been extended, in theory, to N-mode analysis.

VII. Conclusion

The principles of the invention include a method and apparatus for compressing a data base, such that, an ad hoc query can be performed on the compressed representation by directly deriving at least an approximation of the value of the cell specified in the query from the compressed representation. Ad hoc queries can be performed either individually or in the aggregate. Other properties includes that the compressed representation is randomly accessible, that is the time required to reconstruct the value of a cell is constant with respect to the number of rows and columns. Several methods for compressing the data base were described including clustering, spectral methods and SVD. The delta technique provides for correcting errors in the approximation values derived from the lossy compressed representation. An advantageous way of correcting errors is using SVDD. Finally, the principles of the present invention can be extended to multi-dimensional data.

What has been described are the preferred embodiments of the present invention. Other embodiments will be apparent to one of ordinary skill in the art. The present invention is not limited to the embodiments described herein but is only limited by the claims appended hereto.

We claim:

1. A data base system comprising:
    a compressed representation of a data base, said data base having cells containing values and said compressed representation having a property that at least approximations of said value of said cells of said data base are derivable directly from said compressed representation, said property particularly comprising the property of lossy compressed representation; and
    a query engine for responding to a query requesting at least said value of a given cell by deriving at least an approximation of said value of said given cell directly from said compressed representation.

2. The data base system set forth in claim 1 wherein:
    time required to derive said value of said given cell is substantially constant with respect to size of said data base.

3. The data base system set forth in claim 1 wherein:
    said query comprises an aggregate query whose result is a function of a set of said values of said given cells.

4. The data base system set forth in claim 1 further comprises:
    correction information which when accessed by a cell's location, returns information for correcting said cell's value;
    correction means for correcting said errors of said approximation of said values of said cells stored in said table; and
    when querying said compressed representation, determining for said information whether error correction is necessary, and using said correction means to make said correction.

5. The data base system set forth in claim 1 wherein:
    said compressed representation is accomplished by a clustering method.

6. The data base system set forth in claim 1 wherein:
    said compressed representation is accomplished by a spectral method.

7. The data base system set forth in claim 1 wherein:
    said compressed representation is accomplished by computing a singular value decomposition of said data base.

8. The data base system set forth in claim 1 further comprises:
    said data base from which said compressed representation is made.

9. The data base system set forth in claim 1 further comprises:
    correction information which when accessed by a cell's location, returns information for correcting said cell's value.

10. The data base system set forth in claim 9 further comprises:
    correction means for correcting said errors of said approximations of said values of said cells stored in said correction information.

11. The data base system set forth in claim 10 wherein:
    said correction information contains correct values for said cells having an error greater than a predetermined amount.

12. The data base system set forth in claim 11 wherein:
    said correction information contains deltas, said deltas representing the difference between said value of said cell and said approximation of said value.

13. The data base system set forth in claim 12 further comprises:
    a hash table for storing said correction information.

14. A method of querying a data base to obtain values of cells therein comprising the steps of:
    making a compressed representation of said data base, said data base representation having a property that at least approximations of said values of said cells of said data base are derivable directly from said compressed representation, said compressed representation being lossy; and
    after said compressed representation has been made, querying said compressed representation using a query engine for responding to a query requesting at least said value of said cells by deriving at least said approximation of said value of said given cell directly from said compressed representation.

15. The method set forth in claim 14 wherein:

in said step of making said compressed representation, said compressed representation further has a property that at least said approximation of said value of a cell may be further obtained from said compressed representation in a time which is substantially constant with respect to size of said data base.

16. The method set forth in claim 14 wherein said compressed representation is lossy and the method further comprises the steps of:

when making said compressed representation, determining from correction information for each cell whether said approximation of said value of said cell has an error;

when said approximation has such said error, making said error correcting entry for said cell associated with said compressed representation; and when querying said compressed representation, determining from said correction information whether error correction is necessary, and if correction is necessary, using said error correcting entry to make said correction.

17. The method set forth in claim 14 wherein:

in the step of making a compressed representation, said compressed representation is made using a clustering method.

18. The method set forth in claim 14 wherein:

in the step of making a compressed representation, said compressed representation is made using a spectral method.

19. The method set forth in claim 14 wherein:

in the step of making a compressed representation, said compressed representation is made by computing a singular value decomposition of said data base.

20. The method set forth in claim 16 wherein:

in the step of making a compressed representation, said compressed representation is made by computing a singular value decomposition of said data base.

21. The method set forth in claim 19 wherein:

said singular value decomposition is computed in two passes over said data base including, representing said data base as a column to column similarity matrix by constructing said column to column similarity matrix, tracking a partial sum of each said value of said column to column similarity matrix, reading a row of said database at a time, multiplying and adding every combination of elements in that said row to an appropriate element of said column to column similarity matrix;

storing said column to column similarity matrix in memory;

computing eigenvectors of said column to column similarity matrix;

computing eigenvalues of said column to column similarity matrix;

computing a second matrix by multiplying said eigenvectors, an inverse of said eigenvalue and said database represented as a matrix, whereby said compressed representation of said database is derived.

22. The method set forth in claim 20 wherein:

said singular value decomposition is computed in two passes over said data base including, representing said data base as a column to column similarity matrix by constructing said column to column similarity matrix, tracking a partial sum of each said value of said column to column similarity matrix, reading a row of said database at a time, multiplying and adding every combination of elements in that said row to an appropriate element of said column to column similarity matrix;

storing said column to column similarity matrix in memory;

computing eigenvectors of said column to column similarity matrix;

computing eigenvalues of said column to column similarity matrix;

computing a second matrix by multiplying said eigenvectors, an inverse of said eigenvalue and said database represented as a matrix, whereby said compressed representation of said database is derived.

23. A data base system comprising:

a compressed representation of a data base, said data base having cells containing values and said compressed representation having a property that at least approximations of said value of said cells of said data base are derivable directly from said compressed representation;

a query engine for responding to a query requesting at least said value of a given cell by deriving at least an approximation of said value of said given cell directly from said compressed representation;

correction information which when accessed by a cell's location, returns information for correcting said cell's value; and correction means for correcting said errors of said approximations of said values of said cells stored in said information.

24. A data base system comprising:

a compressed representation of a data base, said data base having cells containing values and said compressed representation having a property that at least approximations of said value of said cells of said data base are derivable directly from said compressed representation; and a query engine for responding to an aggregate query whose result is a function of a set of said values from said given cells of said data base by deriving said set of values directly from said compressed representation, said result of said aggregate query being an approximation of a correct result of said aggregate query.

25. The data base system set forth in claim 24 further comprises:

correction information which when accessed by a cell's location, returns information for correcting said cell's value.

26. The data base system set forth in claim 25 further comprises:

correction means for using said correction information to correct errors in said approximation.

27. The data base system set forth in claim 26 wherein:

said correction information contains said values of said cells having an error greater than a predetermined amount.

28. The data base system set forth in claim 27 wherein:

said correction information contains deltas, said deltas represent the difference between said value of said cell and said approximation of said value.

29. The data base system set forth in claim 28 further comprises:

a hash table for storing said correction information.

30. A method of querying a data base to obtain values of cells therein comprising the steps of:

making a compressed representation of said data base, said data base representation having a property that at least approximations of said values of said cells of said data base are derivable directly from said compressed representation;

after said compressed representation has been made, querying said compressed representation using a query engine for responding to a query requesting at least said value of said cells by deriving at least said approximation of said given cell directly from said compressed representation;

when making said compressed representation, determining for each cell whether said approximation of said value of said cell has an error greater than a predetermined amount;

when said approximation has such said error, making said error correcting entry for said cell in correction information associated with said compressed representation; and when querying said compressed representation, determining from said correction information whether error correction is necessary, and if correction is necessary, using said error correcting entry to make said correction.

31. The method set forth in claim 30 wherein said error correcting entry is accomplished by computing singular value decomposition delta.

32. A method of aggregate querying a data base system to obtain a set of values of cells therein comprising the steps of:

making a compressed representation of said data base, said data base representation having a property that said set of values of said cells of said data base are derivable directly from said compressed representation; and after said compressed representation has been made, aggregate querying said compressed representation using a query engine for responding to an aggregate query requesting at least said set value of said cells by deriving said given cells directly from said compressed representation, said response to said aggregate query being an approximation of a correct aggregate query response.

33. The method set forth in claim 32 wherein said compressed representation is lossy and the method further comprises the steps of:

when making said compressed representation, determining for each cell whether said set of value of said cells has an error greater than a predetermined amount;

when said cells has such said error, making said error correcting entry for said cells in correction information associated with said compressed representation; and when querying said compressed representation, determining from said correction information whether error correction is necessary, and if correction is necessary, using said error correcting entry to make said correction.

34. A memory device characterized in that:

said memory device contains a compressed representation of a data base, said compressed representation having a property that at least approximations of said value of said cells of said data base are directly derivable from said compressed representation, said property particularly comprising the property of lossy compressed representation.

35. The memory device set forth in claim 34 further comprises:

correction information which when accessed by a cell's location, returns information for correcting said cell's value.

36. A data base system comprising:

a compressed representation of a data base, said data base having cells containing values and said compressed representation having a property that at least approximations of said value of said cells of said data base are derivable directly from said compressed representation; and a query engine for responding to a query requesting at least said value of a given cell by deriving at least an approximation of said value of said given cell directly from said compressed representation, said compressed representation being accomplished by one of a clustering method, a spectral method, or by computing a singular value decomposition of said data base.

37. A method of querying a data base to obtain values of cells therein comprising the steps of:

making a compressed representation of said data base, said data base representation having a property that at least approximations of said values of said cells of said data base are derivable directly from said compressed representation;

after said compressed representation has been made, querying said compressed representation using a query engine for responding to a query requesting at least said value of said cells by deriving at least said approximation of said value of said given cell directly from said compressed representation; and in said step of making said compressed representation, said compressed representation further having a property that at least said approximation of said value of a cell may be further obtained from said compressed representation in a time which is substantially constant with respect to size of said data base.

38. A data base system comprising:

a compressed representation of a data base, said data base having cells containing values and said compressed representation having a property that at least approximations of said value of said cells of said data base are derivable directly from said compressed representation;

a query engine for responding to an aggregate query whose result is a function of a set of said values from said given cells of said data base by deriving said set of values directly from said compressed representation; and correction information which, when accessed according to a cell's location, returns information for correcting said cell's value.

39. The data base system of claim 1, said compressed representation being accomplished based on an input parameter.

40. The data base system of claim 39, said input parameter for determining a maximum percentage of storage space utilized after compression.

41. The data base system of claim 40, said compressed representation being accomplished based upon said determined maximum percentage of storage space for minimizing a total reconstruction error.

42. The method of claim 14, said step of making a compressed representation being based on an input parameter.

43. The method of claim 42, said input parameter for determining a maximum percentage of storage space utilized after compression.

44. The method of claim 43, further comprising the step of:

based on said input parameter, determining a minimum total reconstruction error for said compressed representation.

45. A memory device characterized in that, said memory device contains code which, when executed in a computer, performs the steps of:

making a compressed representation of said data base, said data base representation having a property that at least approximations of said values of said cells of said data base are derivable directly from said compressed representation, said compressed representation is lossy; and after said compressed representation has been made, querying said compressed representation using a query engine for responding to a query requesting at least said value of said cells by deriving at least said approximation of said value of said given cell directly from said compressed representation.

46. A memory device characterized in that, said memory device contains code which, when executed in a computer, performs the steps of:

making a compressed representation of said data base, said data base representation having a property that at least approximations of said values of said cells of said data base are derivable directly from said compressed representation;

after said compressed representation has been made, querying said compressed representation using a query engine for responding to a query requesting at least said value of said cells by deriving at least said approximation of said given cell directly from said compressed representation;

when making said compressed representation, determining for each cell whether said approximation of said value of said cell has an error greater than a predetermined amount;

when said approximation has such said error, making said error correcting entry for said cell in correction information associated with said compressed representation; and when querying said compressed representation, determining from said correction information whether error correction is necessary, and if correction is necessary, using said error correcting entry to make said correction.

* * * * *